(12) United States Patent
Stoeckle et al.

(10) Patent No.: US 8,833,544 B2
(45) Date of Patent: Sep. 16, 2014

(54) CONVEYING DEVICE

(71) Applicant: Robert Bosch GmbH, Stuttgart (DE)

(72) Inventors: Thomas Stoeckle, Stuttgart (DE); Boris Buesing, Remseck (DE); Karl Hinderer, Fichtenberg (DE); Peter Ludwig, Tuebingen (DE)

(73) Assignee: Robert Bosch GmbH, Stuttgart (DE)

( * ) Notice: Subject to any disclaimer, the term of this patent is extended or adjusted under 35 U.S.C. 154(b) by 28 days.

(21) Appl. No.: 13/678,728

(22) Filed: Nov. 16, 2012

(65) Prior Publication Data

US 2013/0126307 A1     May 23, 2013

(30) Foreign Application Priority Data

Nov. 19, 2011   (DE) .......................... 10 2011 118 977

(51) Int. Cl.
| | |
|---|---|
| *B65G 54/02* | (2006.01) |
| *B65G 15/58* | (2006.01) |
| *B65G 19/22* | (2006.01) |
| *B65G 21/20* | (2006.01) |
| *B65G 19/24* | (2006.01) |
| *B65G 19/30* | (2006.01) |
| *B65G 35/06* | (2006.01) |

(52) U.S. Cl.
CPC ................ *B65G 19/24* (2013.01); *B65G 15/58* (2013.01); *B65G 19/225* (2013.01); *B65G 21/2018* (2013.01); *B65G 19/306* (2013.01); *B65G 35/06* (2013.01)
USPC .......................................... 198/619; 198/804

(58) Field of Classification Search
None
See application file for complete search history.

(56) References Cited

U.S. PATENT DOCUMENTS

| | | | | |
|---|---|---|---|---|
| 4,289,227 | A | * | 9/1981 | Matsui et al. .................. 198/334 |
| 2010/0236445 | A1 | * | 9/2010 | King et al. ............... 104/130.03 |

FOREIGN PATENT DOCUMENTS

| | | |
|---|---|---|
| DE | 1 288 505 B | 1/1969 |
| DE | 228 790 A1 | 10/1985 |
| DE | 42 10 188 A1 | 10/1993 |
| DE | 195 38 350 A1 | 4/1997 |
| DE | 10 2008 020 052 A1 | 11/2009 |
| GB | 1 350 715 A | 4/1974 |
| WO | 2008/064834 A2 | 6/2008 |

OTHER PUBLICATIONS

German Search Report corresponding to DE Application No. 10 2011 118 977.0, received Jul. 16, 2012 (German language document) (5 pages).
European Search Report corresponding to EP Application No. 12 187 907.6, received Feb. 21, 2013 (German language document) (8 pages).

* cited by examiner

*Primary Examiner* — Gene Crawford
*Assistant Examiner* — Lester Rushin
(74) *Attorney, Agent, or Firm* — Maginot, Moore & Beck

(57) ABSTRACT

A conveying device for moving a carrying plate includes a pulling mechanism in the form of a belt. To pull the carrying plate, the belt is contacted against the carrying plate via a magnetic force of at least one permanent magnet. The carrying plate is then entrained by the belt as a result of static friction or sliding friction.

9 Claims, 8 Drawing Sheets

CONVEYING DEVICE

This application claims priority under 35 U.S.C. §119 to patent application no. DE 10 2011 118 977.0, filed on Nov. 19, 2011 in Germany, the disclosure of which is incorporated herein by reference in its entirety.

BACKGROUND

The disclosure relates to a conveying device.

GB 1 350 715 discloses a conveying device of this type. This conveying device has a carrying wagon comprising four wheels, via which said wagon is mounted on two rails. A belt extends between the rails below the carrying wagon, which is movable in the direction of the rails. An electromagnet is arranged on the carrying wagon to connect the belt to the carrying wagon. Above the belt, the carrying wagon has an opening via which the electromagnet engages with the belt, which consists of a magnetic material, in a connected and therefore live state. The electromagnet is mounted displaceably for this purpose. In the de-energized state, it is moved away from the belt by return springs. To energize the electromagnet of the carrying wagon, current paths are provided between the rails and can be electrically connected to the electromagnets via a current tap device arranged on the carrying wagon.

A disadvantage of this solution is the extremely complex mechanical design of the conveying device.

By contrast, the object of the disclosure is to create a conveying device of simple mechanical design.

This object is achieved by a conveying device having the features of the disclosure.

Other advantageous developments of the disclosure are the subject of further dependent claims.

SUMMARY

In accordance with the disclosure, a conveying device has a carrying device used for transportation, in particular a carrying plate. This is mounted and guided via a guideway so as to be displaceable in at least one direction of conveyance. A pulling means extending in particular in the direction of conveyance is arranged to move the carrying device. A magnetic force of a permanent magnet is provided to connect the carrying device to the pulling means, in order to transfer a pulling force from the pulling means onto the carrying device.

This solution has the advantage that the connection between the carrying device and the pulling means is achieved in a simple manner with a low level of mechanical complexity by means of a permanent magnet. In particular, no current feeds of complex mechanical design are required, in contrast to the prior art explained at the outset.

The permanent magnet is preferably arranged on the carrying device. It is therefore conceivable that permanent magnets of different strengths can be used for different carrying devices, that is to say carrying devices of different weight, and that the pulling means does not have to be adapted to the carrying device.

In a further embodiment the pulling means is a belt, in particular a circulating belt. This can extend along the guideway, whereby the carrying device is connectable to the belt at any point of the guideway, as viewed in the direction of conveyance. It would also be conceivable to use a plurality of belts arranged in parallel or in series.

The belt preferably consists of a magnetic material. In particular, it has steel strands extending approximately in the direction of conveyance, which are embedded in a plastics material.

In a further embodiment of the disclosure, the belt has an outer wall face, which can be placed against a contact face of the carrying device. The magnetic force of the permanent magnet acts on the belt via the contact face. An arrangement of this type allows the carrying device and the belt to adhere to one another or to slide relative to one another via said faces. The belt can therefore also drive the carrying device in the direction of conveyance due to frictional forces if the outer belt face and the contact face slide over one another.

The outer wall face of the belt and the contact face of the carrying device are advantageously designed in such a way that they slide over one another when a predetermined pulling force acting on the carrying device is exceeded. The acceleration acting on the carrying device in the direction of conveyance as a result of the belt is thus limited, whereby the carrying device can start-up smoothly from standstill for example. If one or more carrying devices are prevented from moving in the direction of conveyance, for example because they have reached the end of the conveying device (accumulation), the belt can thus slide along easily beneath the one carrying device or plurality of carrying devices. Wear of the belt is thus advantageously extremely low. Furthermore, a drive power of a drive for the belt is also very low, since the pulling force acting on the carrying device is limited by the possibility for sliding between the carrying device and the belt.

A retaining force between the outer wall face of the belt and the contact face of the carrying device is preferably approximately 10 N at most in the direction of conveyance.

A magnet carrier housing can be arranged on the carrying device to mount and fix the at least one permanent magnet. This housing consists in particular of a non-magnetic material, such as aluminum. The contact face of the carrying device may then be formed on the magnet carrier housing.

The magnet carrier housing is advantageously defined by a non-magnetic bearing plate, wherein at least a portion of an outer face of the bearing plate forms the contact face. The permanent magnets may then be supported on an inner face of the bearing plate. A distance between the at least one permanent magnet and the belt can be set by a thickness of the bearing plate. The bearing plate consists in particular of a plastics material.

If a plurality of permanent magnets is provided, these may preferably be arranged in a matrix-like manner in the magnet carrier housing with alternating polarization. The permanent magnets have a circular cylindrical cross-section in particular and lie on the inner face of the carrying plate via their end face. To boost the magnetic force of one or more permanent magnets, a magnetic element, such as a steel plate, may additionally be introduced into the magnet carrier housing.

In a further embodiment of the disclosure, the carrying device is mounted and guided relative to the belt by the guideway in such a way that a retaining portion of the belt lying against the contact face of the carrying device is distanced from a guide plane of the belt. In particular in the region of the contact face, the belt is thus offset in relation to the carrying device, for example in the direction toward a surface normal of its outer wall face. This has the advantage that an inner peripheral face of the belt, via which the belt can be guided, is distanced from a belt guide in the region of its retaining portion, thus reducing friction between the belt and the belt guide. If a plurality of carrying devices are provided, a plurality of retaining portions of the belt are accordingly offset in relation to the guide plane of the belt, thus further considerably reducing any friction between the inner peripheral face of the belt and a guide face.

A coefficient of static friction between the contact face of the carrying device and the outer face of the belt is preferably between 0.3 and 0.5. The contact face of the carrying device and the outer wall face of the belt are substantially planar in this case. However, it would also be conceivable for these faces to be toothed.

A spacing between the contact face and the outer wall face in the magnet-free state is advantageously approximately 0.5 to 2.0 mm, wherein a thickness of the carrying plate may be 1 mm.

To guide the carrying device, the guideway has at least two guide rails arranged substantially at a parallel distance from one another. The carrying device can be guided therebetween, approximately transverse to the direction of conveyance, and can be mounted slidingly in the direction of conveyance.

To minimize bearing friction, bearing rolls for guiding and mounting the carrying device may be provided on the guideway and/or on the carrying device.

For guiding and mounting the pulling means, a pulling means carrier is preferably provided, on which a pulling means drive may also be arranged.

BRIEF DESCRIPTION OF THE DRAWINGS

A preferred exemplary embodiment of the disclosure will be explained in greater detail hereinafter with reference to schematic drawings, in which.

DETAILED DESCRIPTION

Figure 1:
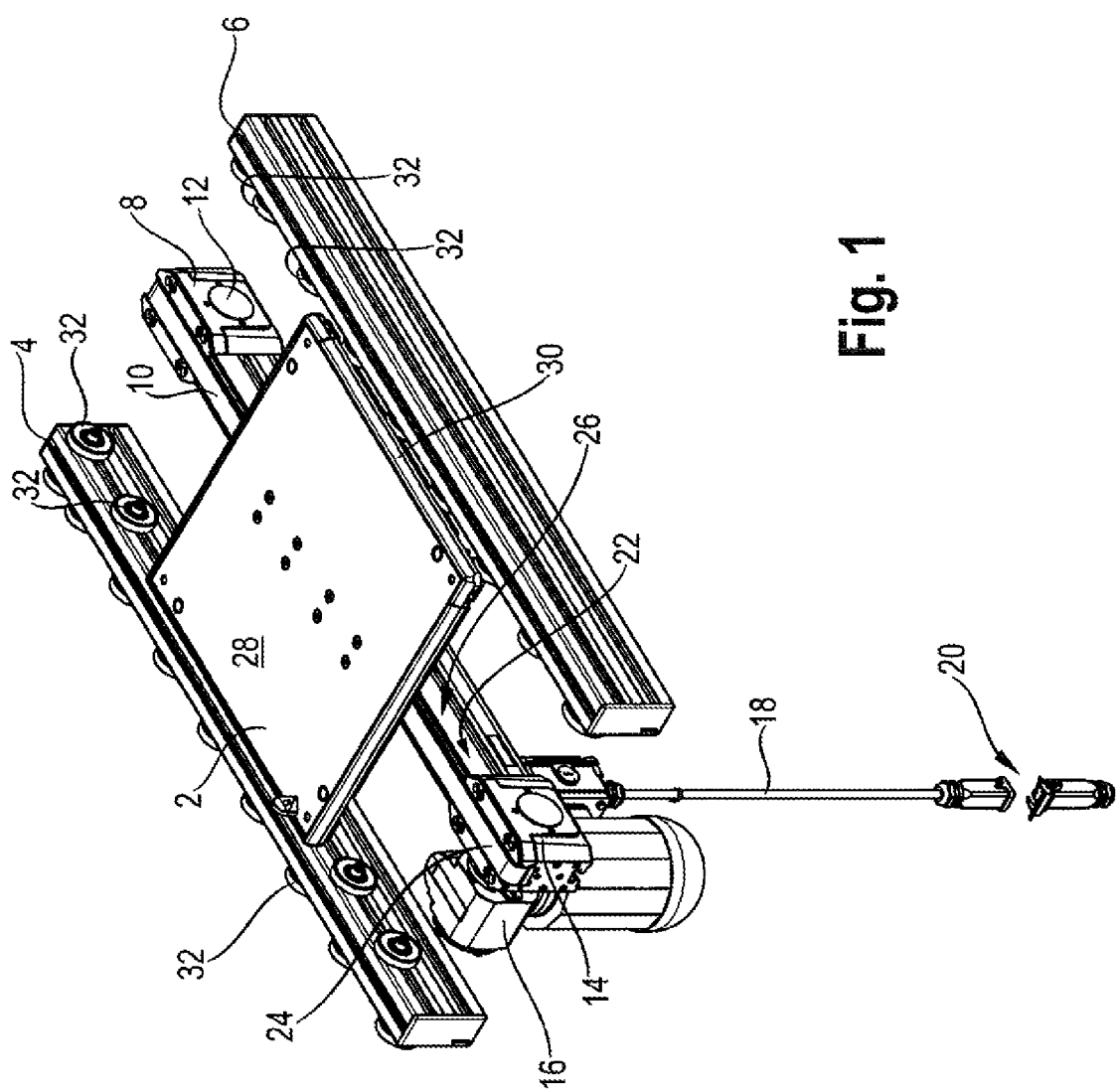
FIG. 1 shows a perspective illustration of the conveying device according to the disclosure in accordance with an exemplary embodiment.

In accordance with FIG. 1, the conveying device 1 has a carrying device formed as a carrying plate 2. The carrying plate 2 is guided laterally between two guide rails 4 and 6 arranged at a parallel distance and is mounted displaceably in a direction of conveyance extending in the longitudinal direction of the guide rails 4 and 6. A pulling means carrier 8 for guiding and driving a pulling means is arranged approximately centrally between the guide rails 4 and 6 in the form of an annular belt 10. This is formed in a circulating manner, with a first and second return region 12 and 14, wherein a drive device 16 for the belt 10 is arranged in the second return region 14. In particular, this drive device is an electric motor, which is contacted electrically via current feeds 18. The current feed 18 is connectable to a current supply (not illustrated) via a plug connection 20.

The belt 10 extends substantially in the direction of conveyance, that is to say along the guide rails 4 and 6, below the carrying plate 2. The belt 10 is tensioned in the direction of conveyance between the return regions 12 and 14. The drive device 16 for driving the belt 10 engages via an inner belt face 22 of the belt 10. For this purpose, the inner belt face may have teeth, corresponding to a toothed belt, in which a pinion of the drive device 16 engages. The belt 10 is arranged in such a way that an upper belt portion 24 is moved adjacent to the carrying plate 2 in the direction of conveyance and a lower belt portion 26 is moved against the direction of conveyance. The belt 10 is magnetic, that is to say it can be attracted by a magnetic force, and has steel strands for this purpose. These are introduced into the belt 10 in a circulating manner and are encased by a plastics material.

So that the carrying plate 2 can be moved by the belt 10 in the direction of conveyance, said carrying plate has permanent magnets on its side pointing toward the belt 10, which will be explained in greater detail in the figures below.

The carrying plate 2 has an upper side 28, on which the objects to be transported can be arranged. Furthermore, the carrying plate 2 is enclosed by a carrying frame 30, via which said carrying plate is mounted and guided on the guide rails 4 and 6. A respective guide rail 4 and 6 has a multiplicity of bearing rolls 32, of which only some are provided with a reference sign in FIG. 2 for the sake of simplicity. The carrying plate 2 is guided laterally via its carrying frame 30 and is mounted displaceably in the direction of conveyance by means of the bearing rolls 32.

A length of the guide rails 4 and 6 is illustrated merely by way of example in FIG. 1. These can be of any length or may consist of a plurality of portions, which can be assembled together in particular. The same is true of the pulling means carrier 8 and the belt 10, which may also be of different lengths. It is conceivable to arrange a plurality of belts in succession in rows for large lengths and/or to arrange one or more belts parallel to one another. A plurality of carrying plates 2 may also be arranged on the conveying device 1. The guide rail 4 also has bearing rolls 32 on its side facing away from the carrying plate 2, said bearing rolls being used for a further conveying device (not illustrated in FIG. 1) arranged parallel to the conveying device 1.

Figure 2:
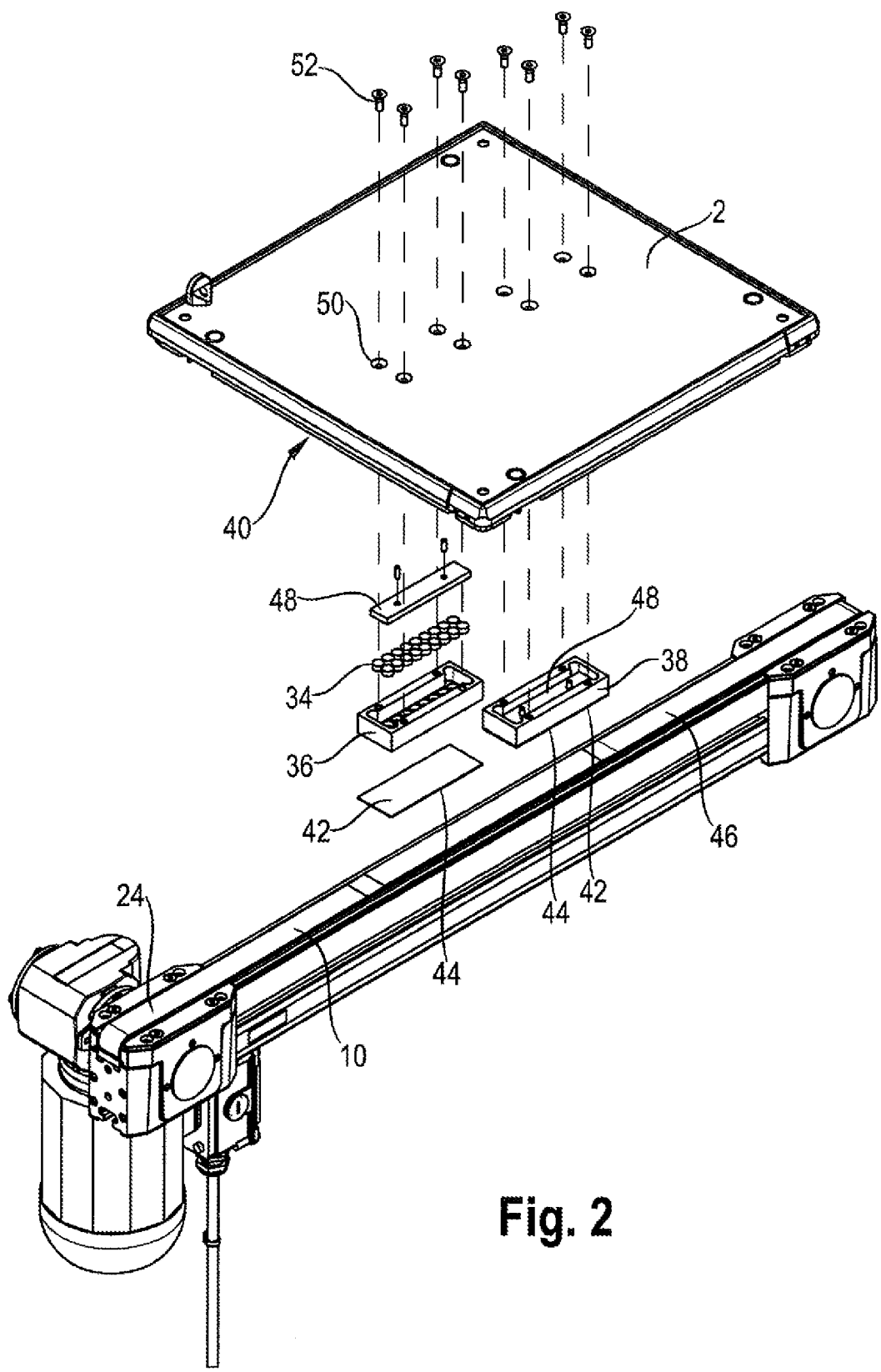
FIG. 2 shows an exploded illustration of part of the conveying device according to the disclosure.

The permanent magnets 34 can be seen in FIG. 2. These are arranged in a magnet carrier housing 36, which will be explained in greater detail further below in FIGS. 7 and 8. In this case, two magnet carrier housings 36 and 38 are provided on the carrying plate 2 and are arranged in succession in rows, as viewed in the direction of conveyance, on an underside 40 of the carrying plate 2 pointing toward the belt 10. The magnet carrier housings 36 and 38 extend substantially in the longitudinal direction of the conveying device and above the belt portion 24 of the belt 10. A respective magnet carrier housing 36 and 38 is closed at the base by a bearing plate 42. This consists of a non-magnetic material, for example plastics material. At its underside, a respective bearing plate 42 forms a contact face 44 pointing away from the permanent magnets 34, the belt 10 lying against or sliding along said contact face via a retaining portion of its outer wall face 46.

In addition to the permanent magnets 34, a magnetic element in the form of a steel plate 48 is also introduced into a respective magnet carrier housing 36 and 38 so as to boost the magnetic force of the permanent magnets 34. Four throughholes 50 are introduced into the carrying plate 2 for a respective magnet carrier housing 36 and 38, the magnet carrier housings 36 and 38 being fixed to the carrying plate 2 by screws 52 via said through-holes.

Figure 3:
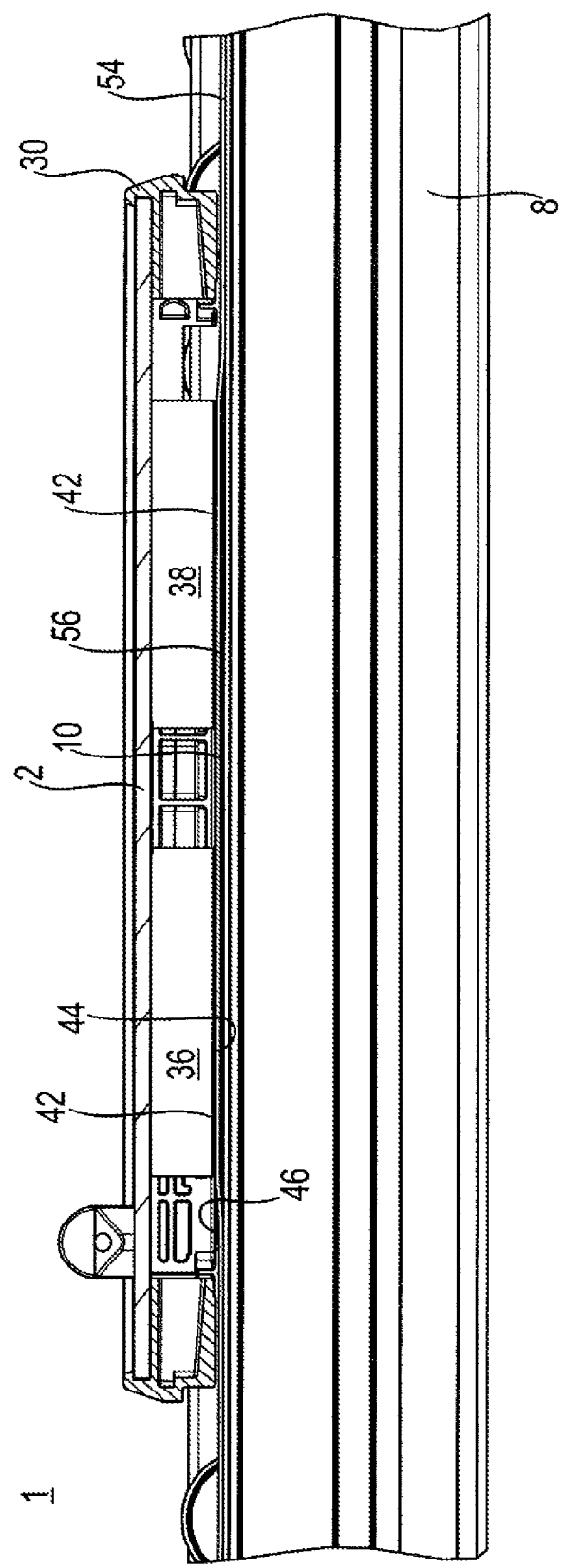
FIG. 3 shows a longitudinal sectional view of a detail of the conveying device according to the disclosure.

The longitudinal section according to FIG. 3 through the conveying device 1 is made in a plane cutting the conveying device 1 approximately between the pulling means carrier 8 and the right-hand guide rail 6 from FIG. 1. FIG. 3 shows the carrying plate 2 with the cut carrying frame 30 and the magnet carrier housings 36 and 38. The belt 10 lies with its outer belt face 46 against the contact face 44 of a respective bearing plate 42 of a respective magnet carrier housing 36 or 38. The belt 10 is raised in this region from a guide face 54 of the pulling means carrier 8, thus producing a gap 56, which is illustrated in black in FIG. 3. The contact faces 44 are thus approximately at a parallel distance from the outer belt face 46 of the belt 10, beyond the part of the belt lying against the contact face 44 as a result of the magnetic force of the permanent magnets 36 from FIG. 2. If a plurality of carrying plates 2 is provided in the conveying device 2, the belt 10 is thus also raised from the guide face 54 of the pulling means carrier 8 by the further carrying plates 2 as a result of the magnetic force, whereby friction between the guide face 54 and the belt 10 is largely reduced on the whole.

Figure 4:
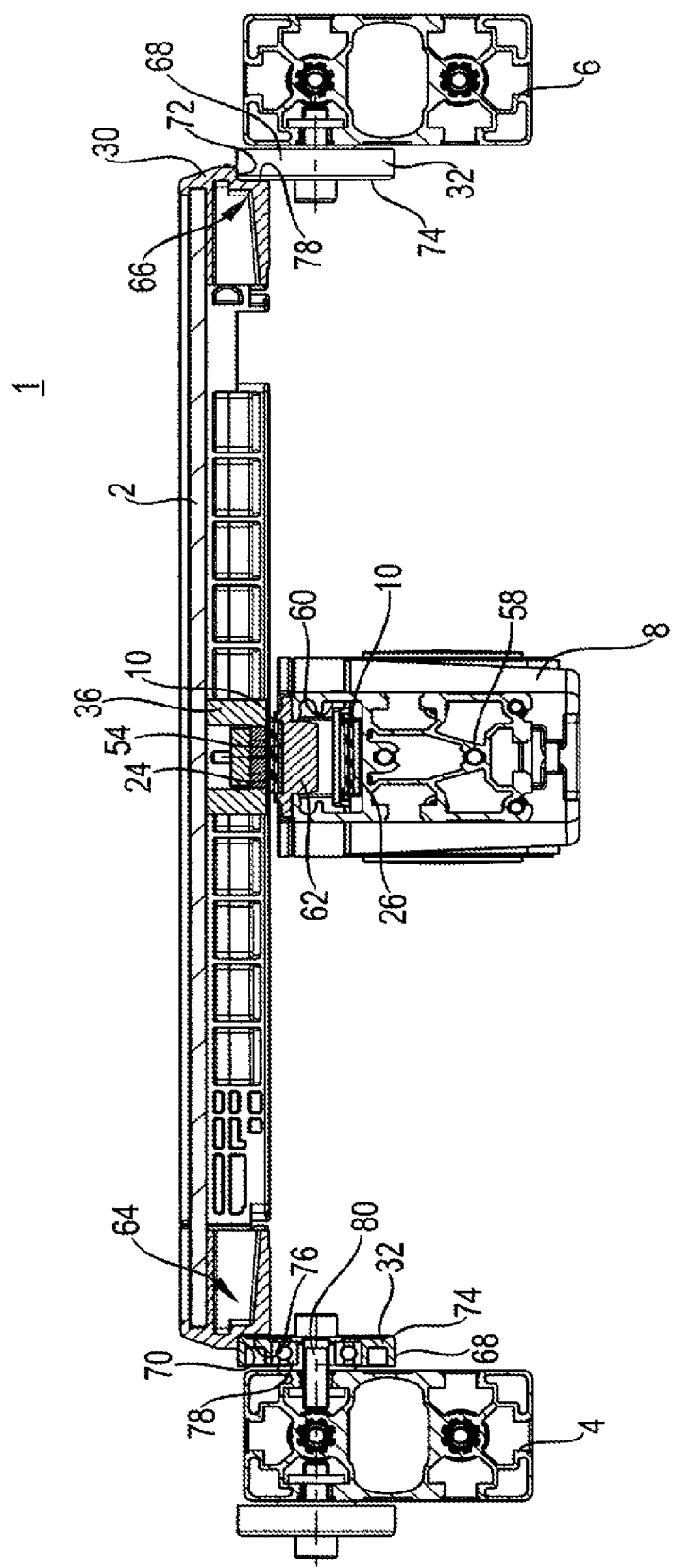
FIG. 4 shows a cross-sectional view of the conveying device according to the disclosure.

In accordance with FIG. 4, the cross-section through the conveying device 1 is made through a plane that cuts the magnet carrier housing 36. In FIG. 4, the pulling means carrier 8 has an inner carrying structure 58, which has an approximately U-shaped elongate recess 60 on its side pointing toward the carrying plate 2, the circulating belt 10 being arranged in said recess. In this case, the belt portion 24 movable in the direction of conveyance extends in a guide rail 62, which is introduced into the elongate recess 60 in the carrying structure 58 and has a U-shaped guide recess in cross-section. This guide rail guides the belt portion 24 of the belt 10 laterally and forms the guide face 54 (see also FIG. 3). On the side of the guide rail 62 pointing away from the carrying plate 2, the belt portion 26 moving against the direction of conveyance is guided via suitable means in the pulling means carrier 8.

The carrying frame 30 of the carrying plate 2 has L-shaped bearing faces 64 and 66 on each of its sides pointing toward the guide rails 4 and 6. In this case, a respective bearing face 64 and 66 has a support face 70 and 72 supported on a respective peripheral face 68 of the bearing rolls 32 and a side guide face 76 and 78 supportable on a respective end face 74 of the bearing rolls 32. A respective bearing roll 32 is mounted via a roller bearing 78, in particular a deep groove ball bearing, on a bearing shaft 80, which is fixed in each case in the guide rails 4 and 6 respectively. A respective guide rail 4 and 6 is formed in the manner of a bearing structure in each case.

Figure 5:
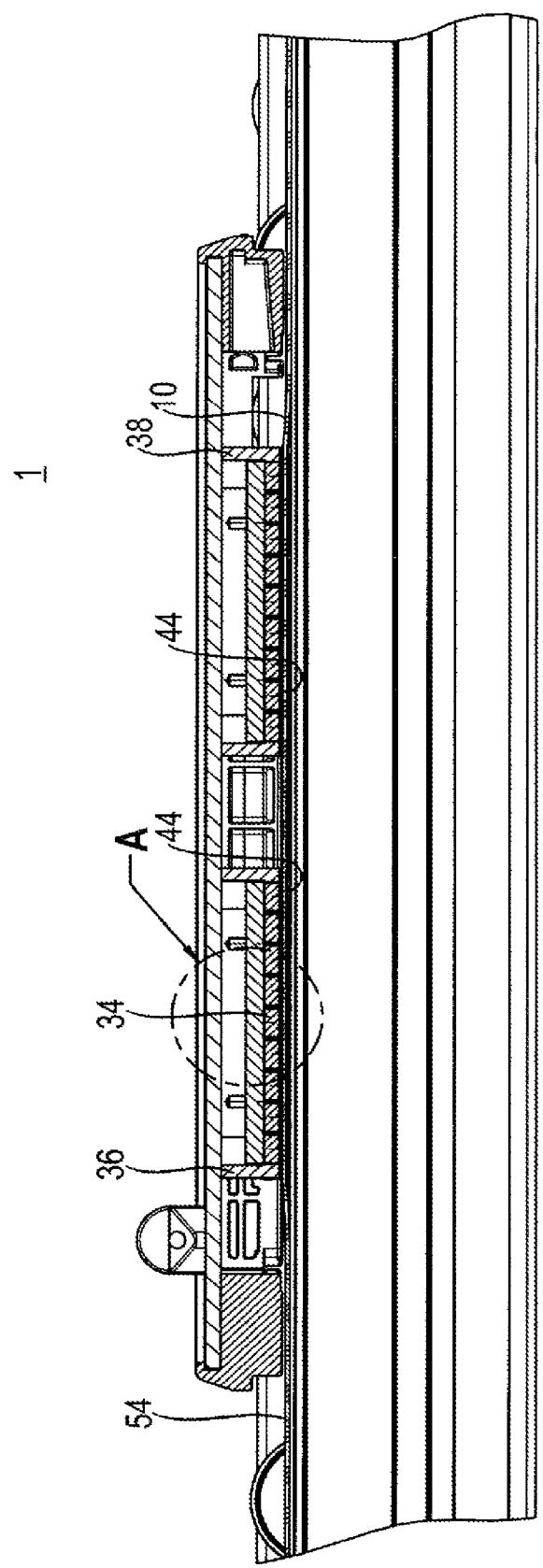
FIG. 5 shows a further longitudinal sectional view of a detail of the conveying device according to the disclosure.

FIG. 5 shows a longitudinal section through the conveying device 1 in a plane that extends through the magnet carrier housings 36 and 38. In this case too, the belt 10 can be seen, which lifts the magnet carrier housings 36 and 38 from its guide face 54 in the region of the contact faces 44. For improved illustration of the faces, an enlarged cross-section of detail A in FIG. 5 is shown in FIG. 6.

Figure 6:
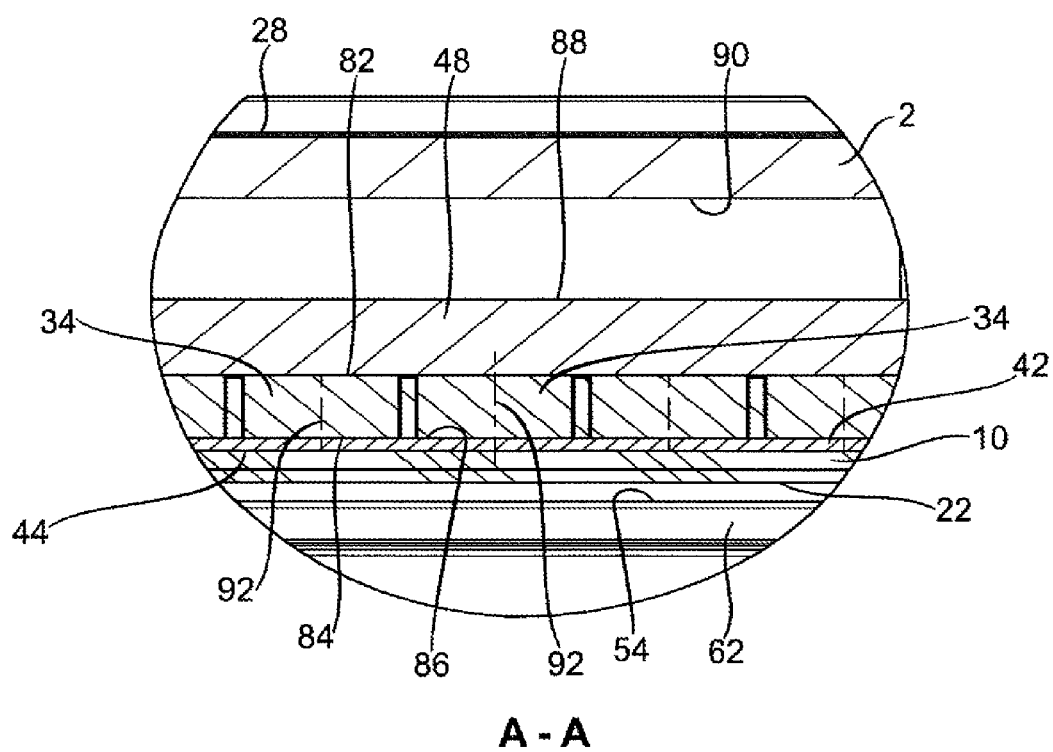
FIG. 6 shows an enlarged detail A of the conveying device from FIG. 5.

In accordance with FIG. 6, the guide belt 10 lies against the contact face 44 of the bearing plate 42. In FIG. 6, a spacing between the inner wall face 22 of the bearing belt 10 and the guide face 54 of the guide rail 62 from FIG. 4 can also be seen. The permanent magnets 34 from FIG. 6 are circular cylindrical with an upper and lower end face 82 and 84 respectively. They lie via their lower end face 84 against an inner face 86 of the bearing plate 42. The steel plate 48 is arranged on their upper end face 82. A free space is provided between an upper side 88 of the steel plate 48 pointing away from the permanent magnets 34 and an underside 90 of the carrying plate 2 pointing toward the steel plate 48 so that magnetic forces in the region of the upper side 28 of the carrying plate 2 are minimal so as not to influence, where possible, objects arranged thereon for transportation as a result of magnetic forces.

A spacing between central axes 92 of the permanent magnets 34 is approximately 110 to 115% of a diameter of the permanent magnet 34. A spacing between the contact face 44 of the bearing plate 42 and of the outer belt face 46 of the carrying belt 10 is preferably between 0.5 and 2.5 mm.

Figure 7:
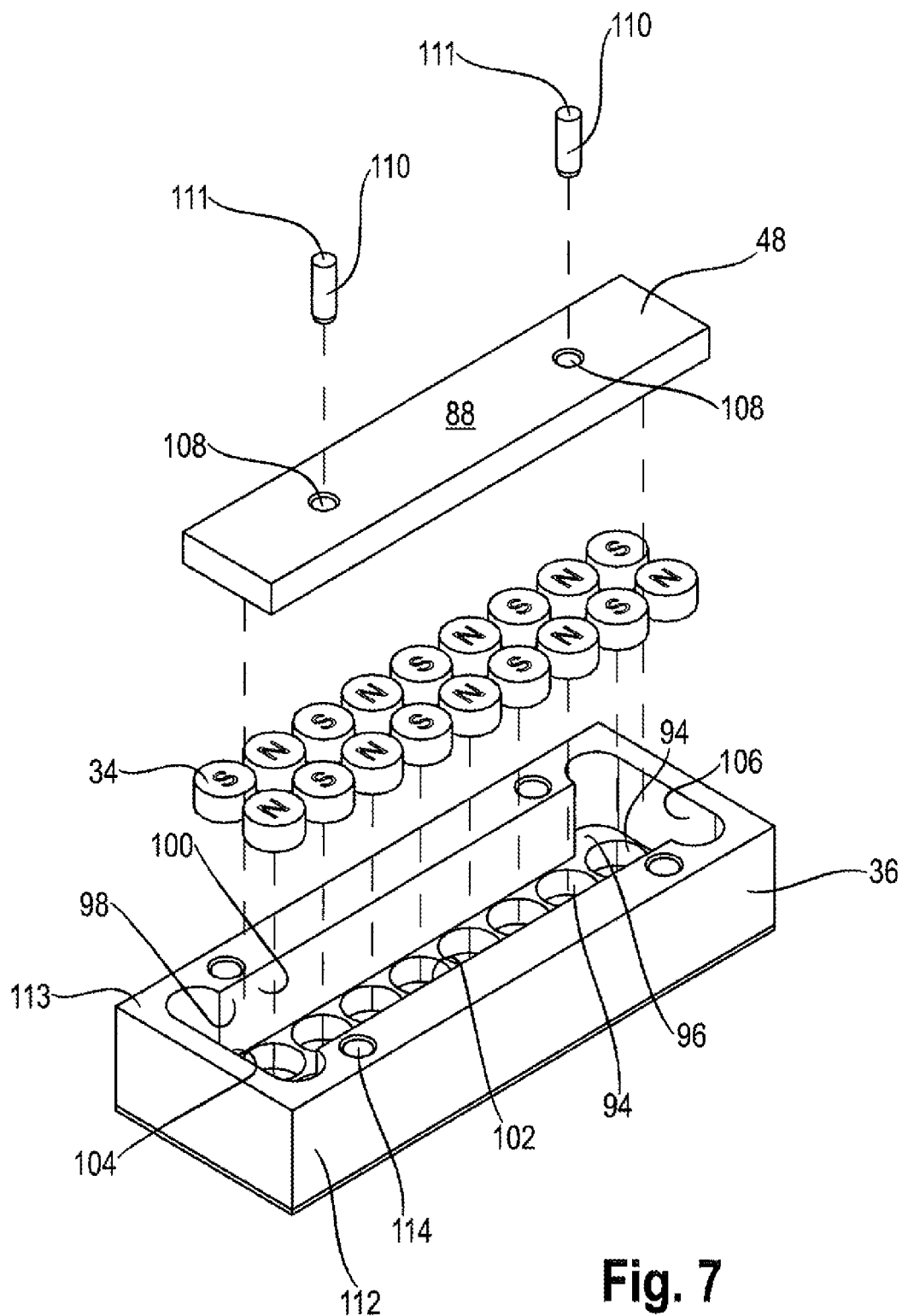
FIG. 7 shows an exploded illustration of a magnet carrier housing of the conveying device according to the disclosure.

In accordance with the exploded illustration of the magnet carrier housing 36 in FIG. 7, said housing has a total of 18 permanent magnets 34, which are arranged in parallel in two rows in a matrix-like manner. The magnet carrier housing 36 consisting of aluminum has a through-hole 94 having an approximately circular cylindrical cross-section for receiving each permanent magnet and into which a respective permanent magnet 34 can be introduced and mounted via its outer peripheral face. A spacing between the permanent magnets 34 is determined by the arrangement of the through-holes 94, and is explained above. This spacing also applies to the permanent magnets 34 arranged in rows relative to one another. The through-holes 94 in the magnet carrier housing 36 are introduced into a base 96 of the approximately cup-shaped magnet carrier housing 36. The cup shape is created by an elongate channel 98 introduced into the magnet carrier housing 36. This channel has two side faces 100 and 102 arranged in a mutually opposed manner at a parallel distance, between which the through-holes 94 are formed. The elongate channel 98 is widened in the transverse direction in the region of its respective end portion 104 and 106 by introducing a recess, which is semi-circular in cross-section, into a respective side face 100 and 102 at each end.

The steel plate 48 has a length corresponding to the elongate channel 98 and a width corresponding to the spacing between the side faces 102 and 104 of the elongate channel 98, whereby said steel plate is mounted laterally in the elongate channel 98 through the magnet carrier housing 36. Two blind holes 108 are introduced into the upper side 88 of the steel plate 48, it being possible to insert a pin 110 into each of said blind holes. An end face 111 of a respective pin 110 pointing away from the upper side 88 lies approximately in a plane with an upper side 113 of the magnet carrier housing 36 pointing toward the carrying plate 2 from FIG. 2, whereby the steel plate 48 can be fixed via the pins 110 from the underside 90 of the carrying plate 2 against the base 96 and/or against the permanent magnets 34 of the magnet carrier housing 36.

Due to the elongate channel 98 widened at each end in the transverse direction, the steel plate 48 can be engaged laterally by an installer or by a machine when inserted into the magnet carrier housing 36.

Two holes 114 are introduced between a respective side face 100 and 102 and an outer peripheral face 112 of the magnet carrier housing 36, the magnet carrier housing 36 being fixable to the carrying plate 2 by means of the screws 52 from FIG. 2 via said holes.

The permanent magnets 34 are arranged in the magnet carrier housing 36 in such a way that their poles are oriented alternately. The poles of the permanent magnets 34 are denoted in FIG. 7 by the reference sign S for South and reference sign N for North. Starting from a respective permanent magnet 34, each of the directly adjacent permanent magnets is arranged in the magnet carrier housing 36 in the opposite pole direction.

Figure 8:
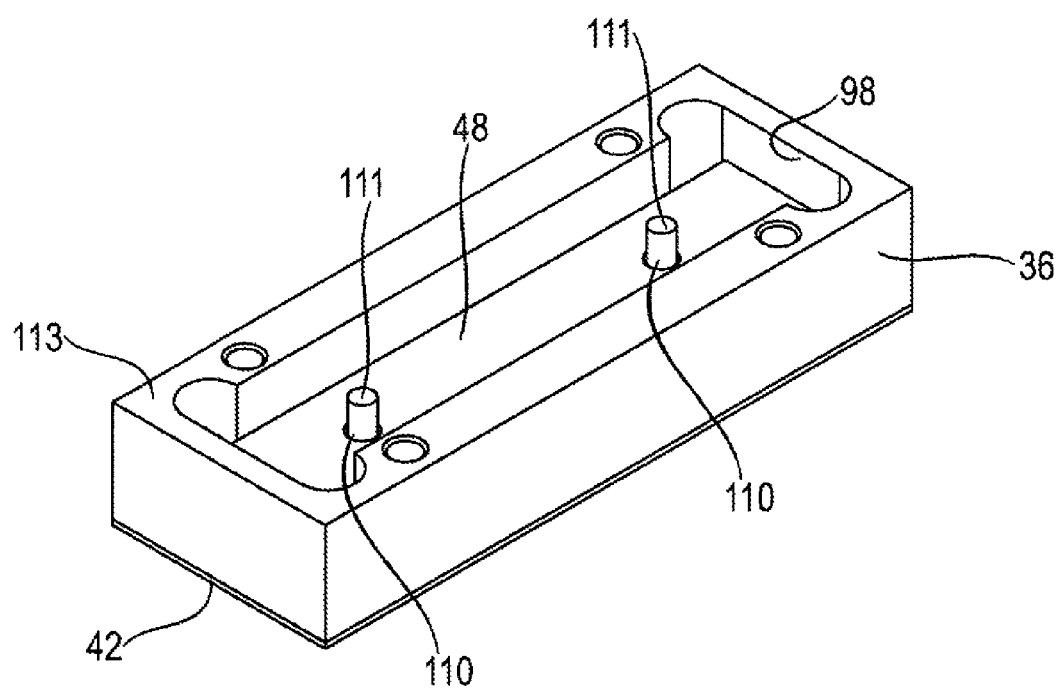
FIG. 8 shows a perspective illustration of the magnet carrier housing.

FIG. 8 shows the magnet carrier housing 36 in the assembled state. In this case, the arrangement of the end faces 111 of the pins 110 and of the upper side 113 of the magnet carrier housing 36 in an approximately identical plane can be seen. The permanent magnets 34 from FIG. 7 are therefore mounted between the bearing plate 42 and the steel plate 48 in the magnet carrier housing 36, wherein the steel plate 48 is in turn fixed via its pins 110 from the carrying plate 3 from FIG. 2 and through the elongate channel 98 in the magnet carrier housing 36.

The operating principle of the conveying device 1 will be explained in greater detail hereinafter with reference to FIGS. 1 to 8.

When the conveying device 1 is in use, the belt from FIG. 1 carries out a circulating movement, wherein the belt portion 24 located adjacent to the carrying plate 2 moves in the direction of conveyance. If the carrying plate 2 is then placed on the guide rails 4 and 6, the belt 10 is thus drawn onto the contact face 44 of the bearing plate 42 by the permanent magnets 34 (see FIGS. 5 and 6) due to the magnetic force. The belt 10 then lifts away from its guide face 54 in this region, thus forming a gap. If the belt 10 then adheres to the contact face 44 of the carrying plate 2, the carrying plate 2 is thus accelerated by a pulling force of the belt 10 produced by the drive device 16 from FIG. 1. If the pulling force acting on the carrying plate 2 exceeds a predetermined value, the belt 10 thus slides via its outer belt face 46 from FIG. 2 over the contact faces 44 of the carrying plate 2, wherein the carrying plate 2 is then accelerated by a frictional force. From a specific speed of the carrying plate 2, the outer belt face 46 and the contact face 44 of the carrying plate 2 adhere to one another again. The maximum pulling force that can be transferred to the carrying plate 2 is advantageously independent of the weight thereof and is therefore independent of the load thereof, since the weight of the carrying plate 2 is carried by the guide rails 4 and 6.

The pulling force that can be transferred onto the carrying plate 2 from the belt 10 is dependent on the magnitude of the magnetic force. The greater the magnetic force, the greater also is the pulling force that can be transferred onto the carrying plate 2. The magnetic force acting on the belt can be adjusted by the number of permanent magnets 34 from FIG. 7. The more permanent magnets 34 provided, the greater is the magnetic force acting on the belt 10. Adaptation to a workpiece weight can thus be achieved by changing the number of permanent magnets 34. For example, the permanent magnets 34 from FIG. 7 have a diameter of 10 mm and consist of NdFeB. An adhesive force directly at the magnet is approximately 2.4 kg, is approximately 1.0 kg at a distance of 1 mm, and is approximately 0.5 kg at a distance of 2 mm.

An adhesive force between the belt 10 and the carrying plate 2 is preferably 10 N.

The pulling force that can be transferred from the belt 10 onto the carrying plate 2 can also be adjusted by the coefficient of friction between the outer belt face 46 and the contact face 44 (see FIG. 3). It has been found that a coefficient of friction μ is approximately between 0.3 and 0.5, wherein the outer belt face 46 and the contact face 44 are preferably planar. However, it is also conceivable for these faces to have toothings, which engage in one another with a positive fit, so as to increase the coefficient of friction.

A conveying device for moving a carrying plate is disclosed, said conveying device comprising a pulling means in the form of a belt. To pull the carrying plate, the belt is contacted against said carrying plate via a magnetic force of at least one permanent magnet, whereby the carrying plate is then entrained by the belt as a result of static friction or sliding friction.

List of Reference Signs 1 conveying device
2 carrying plate
4 guide rail
6 guide rail
8 pulling means carrier
10 belt
12 return region
14 return region
16 drive device
18 current feed
20 plug connection
22 inner belt face
24 belt portion
26 belt portion
28 upper side
30 carrying frame
32 bearing roll
34 permanent magnet
36 magnet carrier housing
38 magnet carrier housing
40 underside
42 bearing plate
44 contact face
46 outer belt face
48 steel plate
50 through-hole
52 screw
54 guide face
56 gap
58 carrying structure
60 elongate recess
62 guide rail
64 bearing face
66 bearing face
68 peripheral face
70 support face
72 support face
74 end face
76 lateral guide face
78 roller bearing
80 bearing shaft
82 end face
84 end face
86 inner face
88 upper side
90 underside
92 central axes
94 through-hole
96 base
98 elongate channel
100 side face
102 side face
104 end portion
106 end portion
108 blind hole
110 pin
111 end face
112 outer peripheral face
113 upper side
114 hole

What is claimed is:

1. A conveying device, comprising:
a guideway including a pair of guide rails arranged parallel to each other and extending between a first position and a second position, the guide rails defining a direction of conveyance between the first and the second positions;
a carrying device extending between the guide rails and movably supported on the guide rails so as to be displaceable along the guide rails in the direction of conveyance;
a pulling mechanism carrier arranged between the pair of guide rails and extending between the first and the second position;

a pulling mechanism movably supported by the pulling mechanism carrier and spaced apart from the guide rails, the pulling mechanism extending between the first and the second positions and being configured to pull the carrying device along the guide rails in the direction of conveyance; and at least one permanent magnet configured to connect the carrying device to the pulling mechanism via a magnetic attraction force between the permanent magnet and the pulling mechanism, wherein the permanent magnet is positioned on the carrying device, and wherein the pulling mechanism is a belt that is rotatably supported by the pulling mechanism carrier and that includes magnetic material, wherein the at least one permanent magnet defines a contact face on the carrying device, wherein the belt has an outer belt face that is drawn into contact with the contact face of the carrying device by the magnetic attraction force generated by the permanent magnet, and wherein the outer belt face of the belt and the contact face of the carrying device are configured to have a predetermined coefficient of friction that enables the outer belt face and the contact face to slide over one another when a predetermined pulling force acting on the carrying device is exceeded.

2. The conveying device according to claim 1, wherein a magnet carrier housing is positioned on the carrying device to mount and fix the at least one permanent magnet.

3. The conveying device according to claim 2, wherein the magnet carrier housing is defined by a non-magnetic bearing plate, wherein at least a portion of an outer face of the bearing plate forms the contact face, and wherein the at least one permanent magnet is supported on an inner face of the bearing plate such that bearing plate is interposed between the at least one permanent magnet and the outer face of the belt.

4. The conveying device according to claim 3, wherein a plurality of permanent magnets are positioned in a matrix-like manner in the magnet carrier housing.

5. The conveying device according to claim 1, wherein the carrying device is mounted and guided by the guideway in such a way that a region of the belt at which the outer belt face is drawn into contact with the contact face of the carrying device is spaced from a guide plane of the belt while regions of the belt at which the outer belt face is not drawn into contact with the contact face of the carrying device are not spaced apart from the guide plane.

6. The conveying device according to claim 1, wherein the coefficient of friction between the contact face of the carrying device and the outer belt face of the belt is between 0.3 and 0.5.

7. The conveying device according to claim 5, wherein a spacing between the contact face of the carrying device and the outer belt face of the belt in the magnet-free state is approximately 0.5 to 2.5 mm.

8. The conveying device according to claim 1, wherein one or more of the guideway and the carrying device include bearing rolls configured to one or more of guide and mount the carrying device.

9. The conveying device according to claim 5, wherein the pulling mechanism carrier includes a guide face that defines the guide plane.

* * * * *